US010867597B2

(12) United States Patent
Deoras et al.

(10) Patent No.: US 10,867,597 B2
(45) Date of Patent: Dec. 15, 2020

(54) ASSIGNMENT OF SEMANTIC LABELS TO A SEQUENCE OF WORDS USING NEURAL NETWORK ARCHITECTURES

(71) Applicant: Microsoft Corporation, Redmond, WA (US)

(72) Inventors: Anoop Deoras, San Jose, CA (US); Kaisheng Yao, Newcastle, WA (US); Xiaodong He, Issaquah, WA (US); Li Deng, Redmond, WA (US); Geoffrey Gerson Zweig, Sammamish, WA (US); Ruhi Sarikaya, Redmond, WA (US); Dong Yu, Kirkland, WA (US); Mei-Yuh Hwang, Beijing (CN); Gregoire Mesnil, Montreal (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/016,186

(22) Filed: Sep. 2, 2013

(65) Prior Publication Data

US 2015/0066496 A1 Mar. 5, 2015

(51) Int. Cl.
*G10L 15/26* (2006.01)
*G10L 15/16* (2006.01)
*G10L 15/18* (2013.01)
*G06N 3/04* (2006.01)

(52) U.S. Cl.
CPC ............. *G10L 15/16* (2013.01); *G06N 3/0454* (2013.01); *G06N 3/0472* (2013.01); *G10L 15/1815* (2013.01); *G10L 15/26* (2013.01)

(58) Field of Classification Search
CPC ............................... G10L 15/26; G06F 17/277
USPC ...................................... 704/232, 9
See application file for complete search history.

(56) References Cited

U.S. PATENT DOCUMENTS 7,257,535 B2   8/2007 Aguilar et al.
8,527,276 B1   9/2013 Senior et al.
2003/0135356 A1* 7/2003 Ying .................... G06F 17/271
                                                      704/1
2004/0167778 A1* 8/2004 Valsan ................... G10L 15/16
                                                      704/231

(Continued)

FOREIGN PATENT DOCUMENTS

CN   1314673 A   9/2001
CN   1333501 A   1/2002

(Continued)

OTHER PUBLICATIONS

Socher, Richard, Christopher D. Manning, and Andrew Y. Ng. "Learning continuous phrase representations and syntactic parsing with recursive neural networks." In Proceedings of the NIPS—2010 Deep Learning and Unsupervised Feature Learning Workshop, pp. 1-9. 2010.*

(Continued)

*Primary Examiner* — Bryan S Blankenagel
(74) *Attorney, Agent, or Firm* — Medley, Behrens & Lewis, LLC

(57) ABSTRACT

Technologies pertaining to slot filling are described herein. A deep neural network, a recurrent neural network, and/or a spatio-temporally deep neural network are configured to assign labels to words in a word sequence set forth in natural language. At least one label is a semantic label that is assigned to at least one word in the word sequence.

20 Claims, 11 Drawing Sheets

(56) References Cited

U.S. PATENT DOCUMENTS

| | | | |
|---|---|---|---|
| 2006/0184471 A1* | 8/2006 | Minamino et al. ............. | 706/16 |
| 2006/0184483 A1* | 8/2006 | Clark .................... | G06N 5/022 |
| | | | 706/45 |
| 2007/0219792 A1* | 9/2007 | Normandin .................. | 704/239 |
| 2008/0114595 A1* | 5/2008 | Vair et al. ..................... | 704/236 |
| 2008/0221878 A1* | 9/2008 | Collobert ........... | G06F 17/2785 |
| | | | 704/232 |
| 2009/0204605 A1* | 8/2009 | Bai .................. | G06F 17/30654 |
| 2009/0210218 A1* | 8/2009 | Collobert et al. ................ | 704/9 |
| 2009/0326945 A1* | 12/2009 | Tian ............................. | 704/254 |
| 2010/0010949 A1* | 1/2010 | Ito ............................ | G06N 3/08 |
| | | | 706/20 |
| 2010/0217684 A1* | 8/2010 | Melcher et al. ................ | 705/27 |
| 2011/0040554 A1* | 2/2011 | Audhkhasi et al. .............. | 704/9 |
| 2011/0301942 A1* | 12/2011 | Collobert ........... | G06F 17/2775 |
| | | | 704/9 |
| 2013/0321356 A1* | 12/2013 | Al-Sharif .............. | G06F 3/0317 |
| | | | 345/179 |
| 2013/0343727 A1* | 12/2013 | Rav-Acha ............ | G11B 27/031 |
| | | | 386/282 |
| 2014/0108460 A1* | 4/2014 | Casella dos Santos | ..................... |
| | | | G06F 16/35 |
| | | | 707/794 |

FOREIGN PATENT DOCUMENTS

| | | |
|---|---|---|
| CN | 1625739 A | 6/2005 |
| CN | 1989547 A | 6/2007 |
| CN | 102056093 A | 5/2011 |
| CN | 102208186 A | 10/2011 |
| CN | 102439590 A | 5/2012 |
| CN | 102968989 A | 3/2013 |
| CN | 103282961 A | 9/2013 |
| CN | 104570835 A | 4/2015 |
| EP | 1217610 A1 | 6/2002 |
| JP | H01276200 A | 11/1989 |

OTHER PUBLICATIONS

"Call classification using recurrent neural networks, support vector machines and finite state automata." Sheila Garfield and Stefan Wermter, Knowledge and Information systems, pp. 131-156. 2006.*

Cho, E., Ha, T. L., & Waibel, A. (2013). Crf-based disfluency detection using semantic features for german to english spoken language translation. IWSLT, Heidelberg, Germany.*

Yao, K., Zweig, G., Hwang, M. Y., Shi, Y., & Yu, D. (Aug. 2013). Recurrent neural networks for language understanding. In Interspeech (pp. 2524-2528).*

"Office Action Issued in European Patent Application No. 15738162. 5", dated Jun. 8, 2020, 7 Pages.

"Office Action Issued in Indian Patent Application No. 201647042403", dated Jun. 9, 2020, 7 Pages.

Muller, Achim F., "Generierung Prosodischer Marker für Ein Multilinguales Sprachsynthesesystem", In Thesis Submitted to Dresden University of Technology, Apr. 5, 2002, 186 Pages.

Graves, Alex, "Generating Sequences with Recurrent Neural Networks", In Repository of arXiv:1308.0850, Aug. 4, 2013, 43 Pages.

"Office Action Issued in Brazilian Patent Application No. BR112016027855-0", dated Jun. 26, 2020, 5 Pages.

Yeh, et al., "Efficient Text Analyser With Prosody Generator-Driven Approach for Mandarin Text-to-Speech", In IEE Proceedings on Vision, Image and Signal Processing, vol. 152, Issue 6, Dec. 1, 2005, pp. 793-799.

"First Office Action Issued in Chinese Patent Application No. 201580031571.4", dated Jan. 16, 2020, 15 Pages.

Sheikhan, Mansour, "Generation of Suprasegmental Information for Speech Using a Recurrent Neural Network and Binary Gravitational Search Algorithm for Feature Selection", In Journal Applied Intelligence archive, vol. 40 Issue 4, Jan. 12, 2014, pp. 772-790.

Perez-Oritz, et al., "Part-of-Speech Tagging With Recurrent Neural Networks", In Proceedings of International Joint Conference on Neural Networks, vol. 3, Jul. 15, 2001, 5 Pages.

"Notice of Allowance Issued in Chinese Patent Application No. 201580031571.4", dated Jul. 13, 2020, 10 Pages.

* cited by examiner

| I | WANT | TO | FLY | TO | BOSTON | TOMORROW |
|---|------|-----|-----|-----|-------------|---------|
| - | - | - | - | - | DESTINATION | AR. DAY |

FIG. 2

| WORDS | | | | | | |
|---|---|---|---|---|---|---|
| ... | FROM | TACOMA | TO | SAN | JOSE | ... |
| ↓ | ↓ | ↓ | ↓ | ↓ | ↓ | ↓ |
| ... | O | B-from.city | O | B-to.city | I-to.city | ... |
| SLOT-TAGS | | | | | | |

FIG. 3

| Sentence | show | flights | from | Boston | to | New | York | today |
|---|---|---|---|---|---|---|---|---|
| Slots/Concepts | O | O | O | B-dept | O | B-arr | I-arr | B-date |
| Named Entity | O | O | O | B-city | O | B-city | I-city | O |
| Intent | Find_Flight | | | | | | | |
| Domain | Airline Travel | | | | | | | |

FIG. 4

ASSIGNMENT OF SEMANTIC LABELS TO A SEQUENCE OF WORDS USING NEURAL NETWORK ARCHITECTURES

BACKGROUND

Computer-implemented spoken language understanding (SLU) systems are configured to automatically extract a semantic concept or fill in a set of arguments (or "slots") embedded in a semantic frame in order to achieve some goal in a human-machine dialogue. Thus, slot filling refers to the extraction of task-specific arguments from a natural language utterance set forth by a user. An exemplary utterance is "I want to fly to Boston from New York next week." Exemplary slots (task specific arguments) that can be extracted from such utterance include the arrival city (e.g., "Boston"), departure date (e.g., "next week"), and departure city (e.g., "New York"). The task of slot filling in SLU remains a challenging problem.

Conventional computer-implemented SLU systems employ generative or discriminative statistical models to perform slot filling. Exemplary generative models used in SLU systems include Hidden Markov Model/Context Free Grammar (HMM/CFG) composite models, and exemplary discriminative statistical models used in SLU systems include conditional random fields (CRFs). The aforementioned models, generalize relatively poorly on complex combinations of patterns.

SUMMARY

The following is a brief summary of subject matter that is described in greater detail herein. This summary is not intended to be limiting as to the scope of the claims.

Described herein are various technologies generally pertaining to spoken language understanding (SLU), and more particularly pertaining to the task of slot filling. Slot filling refers to the assignment of semantic labels to words in a natural language utterance, wherein the words may be or include acronyms, slang terms, numbers, etc. In accordance with aspects described herein, a sequence of words set forth in natural language can be received, as well as (optionally) an indication of a domain corresponding to the sequence of words (e.g., airline travel) and (optionally) an intent corresponding to the sequence of tokens (e.g., purchase a ticket). Responsive to receiving the sequence of words, a respective plurality of features can be ascertained for each word in the sequence of words. For a particular word in the sequence of words, the features may include an identity of the word, identities of other words in a context window with the word (e.g., two words immediately preceding the word and two words immediately subsequent to the word in the word sequence), an indication as to whether the words in the context window are respectively named entities, parts of speech of the words in the context window, etc. In an exemplary embodiment, such features can be provided as input to at least one of a deep neural network (DNN) (also referred to as a deep belief network (DBN) or a recurrent neural network (RNN)), which are trained to assign semantic labels to respective words in the received sequence of words. In another exemplary embodiment, a computer-implemented SLU system can include a spatio-temporally DNN (ST-DNN), which combines the deep structure of DNNs with the time-encoding features of RNNs. The ST-DNN is also trained to assign semantic labels to respective words in the received sequence of words.

The DNN, RNN, or ST-DNN, responsive to receiving the features as input, can output data that is indicative of at least one semantic label to be assigned to at least one word in the sequence of words. For example, the data may be a probability distribution over a sequence of semantic labels (e.g., including null labels) that is potentially assignable to the sequence of words, and the sequence of semantic labels can be respectively assigned to the sequence of words.

RNNs and ST-DNNs are particularly well-suited for the task of slot filling, as it is desirable to take into account context (e.g., slot/concept dependencies) beyond words immediately surrounding a word in the sequence of words that is under consideration. In a DNN-based architecture, such context can be encoded using an n-gram window around the word that is under consideration. Further, labels predicted as being desirably assigned to respective previous words in the sequence of words can be used as additional context for predicting the label for the word currently being considered. In contrast to a DNN, which can be considered a multi-layer feed-forward neural network (NN), a RNN can be considered a single layer or multi-layer feed-forward NN, where an input layer of the RNN includes local n-gram context in addition to a continuous representation of past information.

Also described herein are various technologies pertaining to training a DNN, an RNN, and/or a ST-DNN. With more particularity, discriminative embedding techniques are described herein, which are applicable to DNNs as well as ST-DNNs. Further, with respect to training RNNs, an RNN can be fed with a concatenation of a threshold number of previous steps in time (vectors) in addition to the use of token context windows. This provides a mechanism to obtain a most accurate number of time steps to consider for a particular task. Moreover, regularization of DNNs, RNNs, and ST-DNNs can be undertaken to avoid over-fitting on training data. For instance, "drop-out"-based heuristics can be used for regularizing DNNs and RNNs. For instance, a fraction of input and hidden activation units can be randomly "dropped out" during each step of learning, thereby avoiding overfitting on certain features.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 2-4 illustrate exemplary semantic labels assigned to words in a natural language utterance.

DETAILED DESCRIPTION

Figure 1:
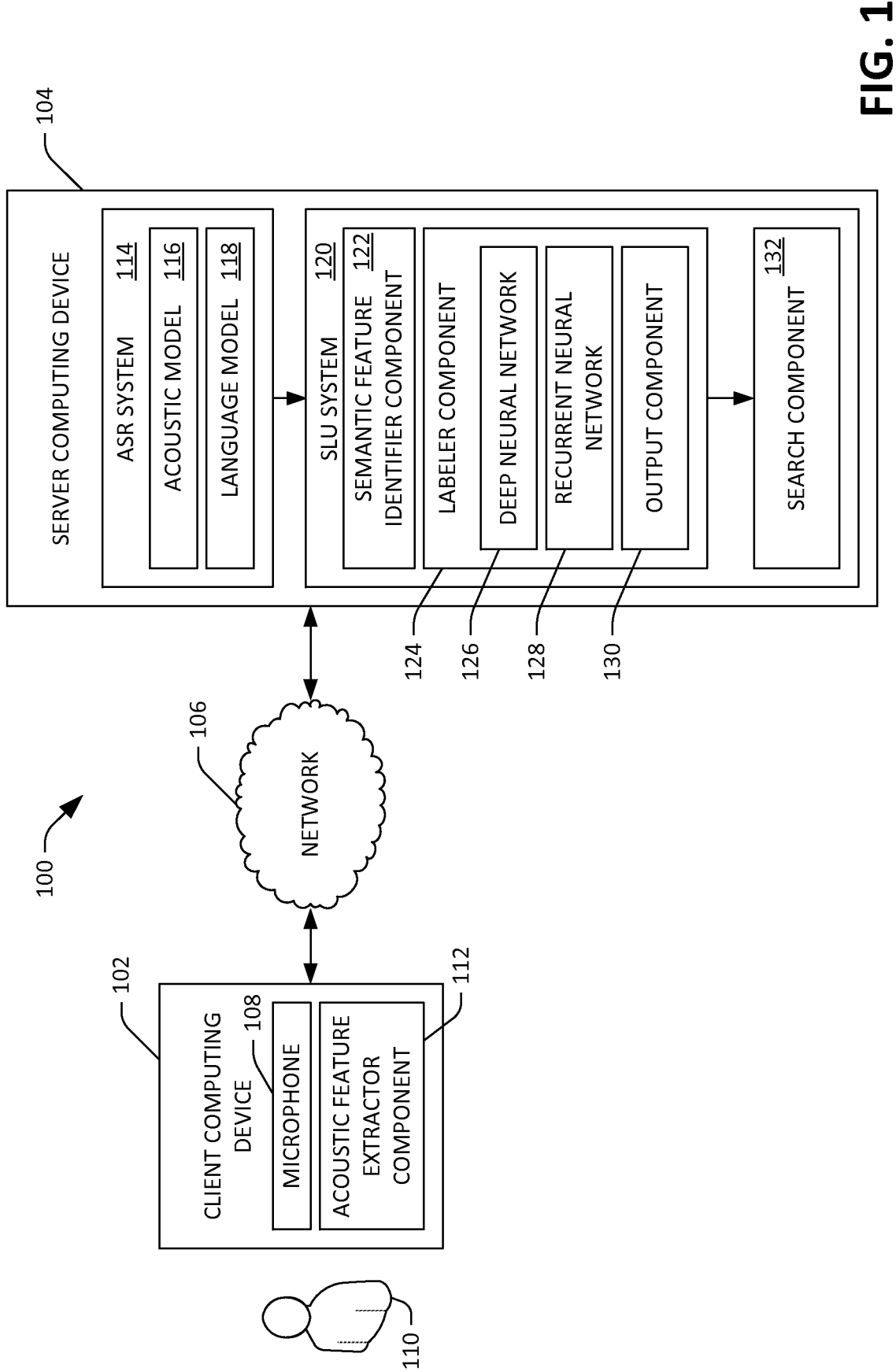
FIG. 1 is a functional block diagram of an exemplary system that facilitates assignment of semantic labels to words in a natural language utterance.

Various technologies pertaining to slot filling (also referred to as slot sequence classification) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass 1) computer-readable data storage that is configured with computer-executable instructions that cause certain functionality to be performed when executed by a processor; and 2) circuitry configured to perform certain functionality. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Various technologies pertaining to the assignation of semantic labels to words in a natural language utterance are set forth herein. The assignation of semantic labels to respective words in a sequence of words set forth in natural language with respect to a particular task is generally referred to as slot filling. For example, with respect to the sequence of words "I want to fly from Cleveland to Seattle tomorrow," the word "Cleveland" can be assigned the semantic label "departure city" (e.g., "Cleveland" can fill the "departure city" slot), the word "Seattle" can be assigned the semantic label "arrival city" (e.g., "Seattle" can fill the "arrival city" slot), and the word "tomorrow" can be assigned the semantic label "departure date" (e.g., "tomorrow" can fill the "departure date" slot).

With reference now to FIG. 1, a functional block diagram of an exemplary system 100 that facilitates assigning semantic labels to tokens in a sequence of tokens set forth in natural language is illustrated. The system 100 comprises a client computing device 102, which may be or include a mobile telephone, a tablet (slate) computing device, a desktop computing device, a laptop computing device, a phablet computing device, a video game console, a television, etc. The system 100 further comprises a server computing device 104 that is in communication with the client computing device 102 by way of a suitable network 106. The network 106 can comprise multiple different types of network connections, including wireless connections, landline connections, cellular connections, etc.

The client computing device 102 includes a microphone 108 that captures a spoken utterance of the user 110, wherein the spoken utterance is set forth in natural language. The spoken utterance set forth by the user 110 may include words, acronyms, slang terminology, numbers, or the like, and the term "words" is intended to encompass all of such. The client computing device 102 may also include an acoustic feature extractor component 112 that receives the spoken utterance captured by the microphone 108 and extracts acoustic features from such utterance. The client computing device 102 can then be configured to transmit acoustic features extracted from the spoken utterance by the acoustic feature extractor component 112 to the server computing device 104 by way of the network 106.

The server computing device 104 comprises an automatic speech recognition (ASR) system 114 that is configured to recognize words, acronyms, numbers, etc. in the utterance set forth by the user 110. The ASR system 114 may include an acoustic model 116 that receives the acoustic features as input and outputs, for example, a probability distribution over predefined phonetic labels. Pursuant to an example, the labels can be phones. The acoustic model 116 may be or include any suitable type of model, such as a Hidden Markov Model/Gaussian Mixture Model (HMM/GMM), a deep neural network (DNN), or the like. The ASR system 114 may further include a language model 118 that models a language spoken by the user 110. In combination, the acoustic model 116 and the language model 118 can recognize and output words, numbers, acronyms, etc. in the spoken utterance set forth by the user 110.

The server computing device 104 also includes a spoken language understanding (SLU) system 120 that receives a sequence of words from the ASR system 114 and assigns respective labels to words in the sequence of words. Such labels include at least one semantic label, and may optionally include null labels (e.g., a word in the spoken utterance may not correspond to any of a plurality of predefined semantic tags). While not shown, the SLU system 120 can include a domain determiner component and an intent determiner component. The domain determiner component is configured to identify a general domain to which the utterance set forth by the user 110 is directed. Continuing with the example set forth above, if the spoken utterance set forth by the user 110 is "I want to fly from Cleveland to Seattle tomorrow," the domain may be "flight information" and the intent may be "purchase a ticket." A determined domain and/or intent can be employed in connection with selecting a suitable model that is trained to assign semantic tags to words in a sequence of words when such sequence of words corresponds to the domain/intent. In another example, a determined domain and/or intent can be provided as an input feature to a model that is trained to assign semantic labels to words in sequences of words across several domains/intents.

The SLU system 120 can include a semantic feature identifier component 122 that can identify respective semantic features for each word in the received sequence of words. Exemplary features that can be identified for a word by the semantic feature assignor component 122 include, but are not limited to, an identity of the word, words in a predefined context window with the word (e.g., a threshold number of immediately preceding words in the sequence of words and a threshold number of immediately subsequent words in the sequence of words), parts of speech/potential parts of speech of words in the context window, an indication as to whether words in the context window are named entities, named entities corresponding to words in the context window, etc.

The SLU system 120 can further include a labeler component 124 that receives semantic features output by the semantic feature identifier component 122 for words in the sequence of words, and assigns respective labels to words in the sequence of words based upon the semantic features. The labels that can be assigned by the labeler component 124 include semantic labels and null labels. The semantic labels can correspond to predefined slots for a certain domain/intent, such as with the example related to air travel set forth above.

In contrast to conventional approaches for assigning semantic labels to words in a sequence of words (in natural language), the labeler component 124 can comprise at least one of a DNN 126 or a recurrent neural network (RNN) 128, wherein the at least one of the DNN 126 or the RNN 128 is used in connection with performing the labeling of words in the sequence of words. The at least one of the DNN 126 or the RNN 128 are trained to assign labels pertaining to a particular domain and/or intent. In another exemplary embodiment, the at least one of the DNN 126 or the RNN 128 can be configured to receive an identified domain/intent as an input feature. The DNN 126, as will be shown in greater detail herein, comprises an input layer, a plurality of hidden layers, and an output layer. For instance, a number of hidden layers in the DNN 126 may be between one and ten hidden layers. The input layer of the DNN 126 receives the semantic features output by the semantic feature identifier component 122 to at least one word in the sequence of words received by the SLU system 120, and outputs a probability distribution over potential labels (including a null label) that may be assigned to the at least one word.

The RNN 128 also includes an input layer that receives semantic features for a word of interest as output by the semantic feature identifier component 122. The RNN 128 can comprise a single hidden layer and an output layer. Pursuant to an example, the RNN 128 may be an Elman-type RNN or a Jordan-type RNN. As indicated above, the DNN 126 and/or the RNN 128 may be employed in connection with assigning labels to respective words in the received sequence of words.

The labeler component 124 may further comprise an output component 130 that receives output (e.g., probability distribution over assignable labels) from the at least one of the DNN 126 or the RNN 128, and assigns at least one semantic label to at least one word in the sequence of words based upon such output. For instance, in the exemplary sentence set forth above, the output of the at least one of the DNN 126 or the RNN 128 can indicate that the word "Cleveland" has a relatively high probability of being associated with a semantic tag "departure city." The output component 130 can cause such semantic tag to be assigned to the word "Cleveland" based upon the output of the at least one of the DNN 126 or the RNN 128.

The server computing device 104 may further include a search component 132 that can execute a search over contents of a data repository (not shown) based at least in part upon the semantic label assigned to the at least one word in the sequence of words. For instance, the search component 132 can search for flights on the date specified in the spoken utterance of the user 110 that depart from Cleveland and arrived in Seattle.

While the ASR system 114 and the SLU system 120 have been shown and described as residing on the server computing device 104, it is to be understood that the ASR system 114 and/or the SLU system 120 may reside on the client computing device 102. Further, while the ASR system 114 and the SLU system 120 are shown as being included on a single server computing device 104, it is to be understood that the ASR system 114 and/or the SLU system 120 may reside on different computing devices or be distributed across multiple computing devices. Further, while the acoustic feature extractor component 112 is shown on the client computing device 102, such component 112 may be included on the server computing device 104, such that the client computing device 102 transmits an audio file to the server computing device 104 by way of the network 106 responsive to the microphone 108 capturing a spoken utterance of the user 110.

With reference now to FIGS. 2-4, assignation of exemplary labels to respective words in sequences of words is illustrated. Referring solely to FIG. 2, the user 110 has set forth the utterance "I want to fly to Boston tomorrow." The labeler component 124 of the SLU system 120 assigns the semantic labels "destination" and "arrival day" to the words "Boston" and "tomorrow," respectively. The labeler component 124 assigns null labels to the words "I," "want," "to," "fly," and "to."

Referring now to FIG. 3, another exemplary sequence of words and respective labels assigned thereto are is illustrated. The sequence of words comprises the words "from," "Tacoma," "to," "San," and "Jose." The labeler component 124 has assigned the words "from" and "to" a label of "out," analogous to a null label. The labeler component 124 has assigned the word "Tacoma" a semantic label "Begin—from.city." Such label indicates that a departure city begins with the word "Tacoma." Similarly, the labeler component 124 has assigned the semantic label "Begin—to.city" to the word "San" in the sequence of words. This semantic label indicates that the arrival city begins with the word "San." Additionally, the labeler component 124 has assigned the semantic label "In—to.city" to the word "Jose" in the sequence of words, which indicates that the arrival city includes, but does not begin with, the word "Jose."

Referring now to FIG. 4, exemplary labels assigned to words in a sequence of words are illustrated. The SLU system 120 can receive the sequence of words "show flights from Boston to New York today." The SLU system 120 can ascertain that such sequence of words pertains to airline travel (e.g., through utilization of a domain determiner component), and can further determine that the intent of the user 110 is to locate flights (e.g., through utilization of an intent determiner component). The labeler component 124 can then be configured to assign semantic labels to at least some of the words in the word sequence. Further, the SLU system 120 can identify named entities in the sequence of words. For example, the semantic feature assignor component 122 can identify that the word "Boston" refers to a city (e.g., a city that begins with the word "Boston"), that the word "New" refers to a city that begins with the word "New," and the word "York" refers to a city that includes, but does not begin with, the word "York."

Such named entity information can be provided to the at least one of the DNN 126 or the RNN 128 as input features. The labeler component 124 can then assign labels to the words in the sequence of words. For example, for the words "show," "flights," "from," and "to," the labeler component 124 can assign an "out" (e.g., null) label. For the word "Boston," the labeler component 124 can assign a semantic label that indicates that such word refers to a departure city that begins with "Boston." The labeler component 124 can assign a semantic label to the word "New" that indicates that such word refers to an arrival city that begins with the word "New." The labeler component 124 can assign a semantic label to the word "York" that indicates that the arrival city includes, but does not begin with, the word "York." Finally, the labeler component 124 can assign a semantic label indicating that the word "today" refers to a date that begins with the word "today." While FIGS. 2-4 set forth examples pertaining to travel, it is to be understood that the at least one of the DNN 126 or the RNN 128 can be trained to assign suitable labels for a variety of domains/intents.

Figure 5:
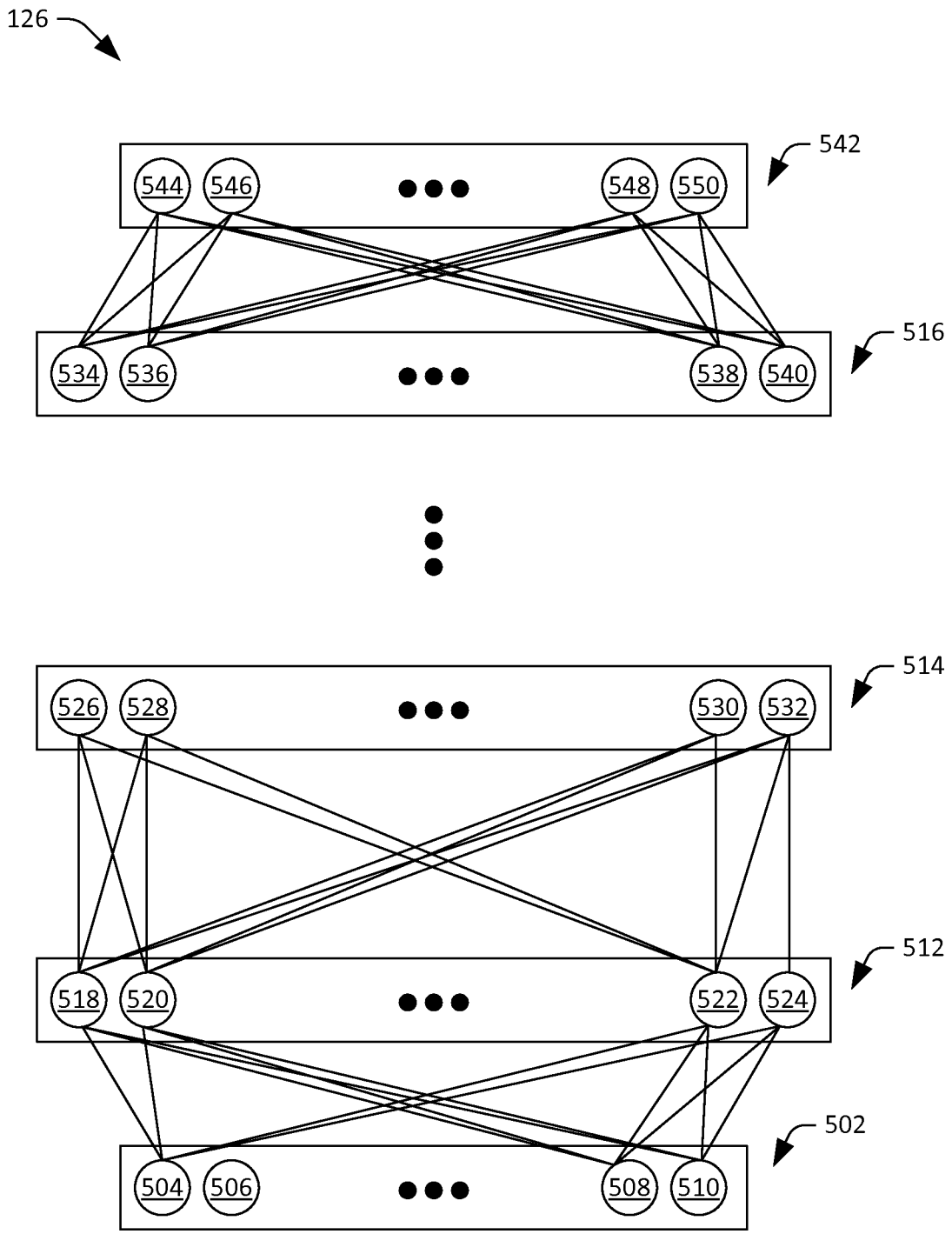
FIG. 5 illustrates an exemplary deep neural network (DNN).

With reference now to FIG. 5, an exemplary architecture of the DNN 126 is presented. The DNN 126, as employed in the labeler component 124, is a discriminative model that models posterior distribution of label sequence for the received sequence of words. Modeling in this fashion can accomplished by decomposing the conditional probability of label sequence into a product of local probability functions, each modeling the probability distribution of a particular label (e.g., a semantic label or null label) for a particular time (word) given the context at the particular time. More formally, P(C|W) can be decomposed as follows:

$$P(C|W)=\Pi_{t=1}^{T}P(c_t|c_1^{t-1},W)\approx\Pi_{t=1}^{T}P(c_t|c_{t-1},\gamma_t(W)), \quad (1)$$

where $C=c_1, \ldots, c_T$, $c_t \in C$ is a sequence of slot labels associated with an observed input sequence of words $W=w_1, \ldots, w_T$, and $\gamma_t$ captures local features (lexical features, named entities, parts of speech, etc.) at time t. Once individual local models are trained, Viterbi decoding can be carried out to locate a best slot sequence (e.g., a best sequence of labels) for a received sequence of words.

Unlike tasks such as acoustic modeling and digit recognition, wherein an input feature vector presented to a DNN is dense and real valued, classification tasks in natural language processing have input features that are sparse and at least as long as the size of the lexical vocabulary (e.g., on the order of thousands to hundreds of thousands). A relatively large input feature vector can be a bottleneck for a pre-training phrase when training the DNN 126, as each step of training involves reconstructing (e.g., through Gibbs sampling from an exponential distribution) all elements of an input feature vector. To mitigate such deficiencies associated with training DNNs, a discriminative embedding technique, described in greater detail below, can be employed, wherein such technique projects the sparse and large input layer onto a relatively small dense and real-valued feature vector, which is then subsequently used for pre-training the DNN 126, and then to perform discriminative classification. Experimentally, it has been found that if the embedding procedure is carried out in a discriminative fashion (e.g., by minimizing the tagging errors) rather than in an unsupervised fashion, a much better feature representation may be obtained. Further, the totality of all features can be projected onto the continuous space, thus resulting in a better embedding relative to conventional approaches.

With more detail pertaining to the architecture of the DNN 126 set forth in FIG. 5, the deep neural network 126 comprises an input layer 502, which includes a plurality of nodes 504-510 that are representative of values of an input feature vector (where the DNN 126 has been trained based upon features represented in the input feature vector). In an exemplary embodiment, features that can be represented in the input feature vector and received at the input layer 502 of the DNN 126 can include, but are not limited to including, lexical features, named entities, syntactic features, and semantic labels assigned to words in a context window. With respect to lexical features for a particular word in a sequence of words, the word and other words in a context window (e.g., some threshold number of words preceding the word and subsequent to the word). Another exemplary feature includes named entities. For instance, words in a vocabulary can be marked with a named entity. Each word in the context window (e.g., the five words) can have a vector associated therewith, with a size equal to the size of the named entity gazetteer. Further, as indicated above, parts of speech can be assigned to each word, as well as hypothesized labels assigned to previous words in the sequence of words. As indicated above, other features are contemplated.

The deep neural network 126 comprises a plurality of hidden layers 512-516, wherein each of the hidden layers 512-516 comprises a respective plurality of nodes (e.g., neurons). For example, the hidden layer 512 comprises nodes 518-524, the hidden layer 514 comprises nodes 526-532, and the hidden layer 516 comprises nodes 534-540. The nodes 504-510 in the input layer 502 are fully connected to the nodes 518-524 in the (lowest) hidden layer 512, such that a node in the input layer 502 is coupled to all nodes in the hidden layer 512 by way of respective weighted edges, wherein weight assigned to the edges are learned during training. The nodes 518-524 are generally representative of nonlinear activation functions (e.g., sigmoid functions). The nodes 518-524 are fully connected to nodes 526-532 in the next hidden layer 514 by way of respective weighted edges, and so on.

The DNN 126 additionally includes an output layer 542, which comprises a plurality of output nodes 544-550. The nodes 544-550 can be representative of potential labels that may be applied to tokens in the sequence of tokens. Values corresponding to such nodes may be probabilities that the respective labels are to be assigned to a word whose semantic features were provided to the input layer 510. As shown, the nodes 534-540 in the (uppermost) hidden layer 516 are fully coupled to the nodes 544-550 in the output layer 542 by way of weighted edges.

It can be ascertained that the DNN 126 can be composed by stacking probabilistic models that are referred to as restricted Boltzmann machines (RBMs). Conventionally, RBMs are trained using the contrastive divergence learning procedure, where each RBM layer is trained by using nodes from a lower hidden layer as input/visible nodes. DNNs have higher modeling capacity than shallow networks, but tend to be more difficult to train due to the objective function of DNNs being highly non-convex function of the parameters, with many distinct local minimum in parameter space. Contrastive divergence based pre-training of such RBM layers is conventionally carried out to initialize weights of DNNs. Thus, after a DNN is initialized, a back propagation algorithm can be used to fine-tune edge weights in a discriminative fashion.

Therefore, as shown in FIG. 5, the DNN 126 can be formed by stacking multiple RBMs on top of one another. Thus, input to an ith RBM is output of an $i-1^{th}$ RBM. The ith stacked RBM can be represented by $RBM_i$, and the weight parameters for such layer can be denoted by $\theta_i$. Thus, once $RBM_1$ is constructed and pre-trained, the posterior distribution over hidden vectors $P(h|v; \theta_i)$ can be obtained, and h can be sampled, which then becomes input for the second RBM layer: $RBM_2$. Continuing in such fashion, the DNN 126 can be formed with weights initialized by the pre-training procedure.

The output layer 542 of the DNN 126 uses a soft max function to compute the probability distribution over the labels. A back propagation algorithm can be used to fine-tune weights of the DNN 126. In an exemplary embodiment, a sigmoid activation function can be used to obtain values at various hidden and output nodes given the corresponding inputs.

As referenced above, a discriminative embedding technique can be used in connection with training the DNN 126. With more particularity, for the natural language processing applications described herein, n-gram lexical features can be represented as a concatenation of n "one of N coded" binary vectors, where N is the size of the lexical vocabulary. With a lexical vocabulary running into the thousands, such feature representation can become relatively large. This is not so much of a problem for back propagation, because during back propagation only those weights which are connected to non-zero input units need to be updated (at most n). It is, however, the pre-training phase for which large input layers cause a bottleneck, as it has to be reconstructed in each epoch. Accordingly, the discriminative embedding technique described herein involve dividing the training procedure into three phases: 1) obtaining embeddings; 2) pre-training with embedded features; and 3) fine tune the weights with back propagation.

With respect to the first phase, for a network with a sparse input layer, one hidden layer, and output label layer, weights can be randomly initialized and back propagation training can be run to minimize the classification error and to obtain a set of weights between the input layer and the hidden layer ($\theta_1$). For every input feature, the values at the hidden layer can be obtained by forward propagating units through the trained network. The hidden units act as the feature embeddings for the corresponding inputs.

With respect to the second phase, embedded features can be obtained for each input sample. With this as input, the DNN 126 can be formed by stacking RBMs on top of one another. Subsequently, pre-training of such network can be undertaken with random initialization of weights to obtain sets of weights $\theta_2, \theta_3, \ldots$.

With respect to the third phase, the original sparse binary input layer can be attached with the above RBM stack and the output layer 542. The weights can then be randomly initialized between the topmost RBM layer (hidden layer 516) and the output layer 542. The weights between the input layer 502 and the first RBM layer (hidden layer 512) can be initialized with $\theta_1$, and the remainder of the RBM stack can be initialized with $\theta_2, \theta_3, \ldots$. Such weights can be fine-tuned (except for $\theta_1$) with back propagation to minimize the classification (labeling) error rate.

Learning techniques used in connection with learning the above-mentioned weights are now described. In an exemplary embodiment, training data utilized to train the DNN 126 can be split into several mini-batches, and the weights of the DNN 126 can be learned using an online version of conjugate gradient optimization. Unlike stochastic gradient descent (SGD) optimization, conjugate gradient optimization does not require tuning of the learning parameter and is generally believed to converge faster. Rather than using conjugate gradient optimization in batch mode, however, which may be impractical for a large training corpus, conjugate gradient optimization can be used under an online (or stochastic) setting. That is, for each mini-batch, the parameters can be updated by running conjugate gradient optimization for a finite number of steps. Thus, rather than learning the local optimum solution for each mini-batch, the search can be truncated after a relatively small number of steps (e.g., three). Weights, however, have to be regularized to avoid over-fitting the DNN 126 on the training data. For instance, L2 regularization of the entire weight vector can be carried out as a way to penalize very large values. Instead of continually scaling down the L2 norm of the incoming weight vector until the constraint is satisfied, each individual weight can be constrained only once at every update. Thus, if the weight update increases the absolute value of a weight above a threshold, it can be scaled down by dividing it with some constant. The value of such constant and the threshold can be chosen by performing a cross-validation experiment on a held-out data set.

Figure 6:
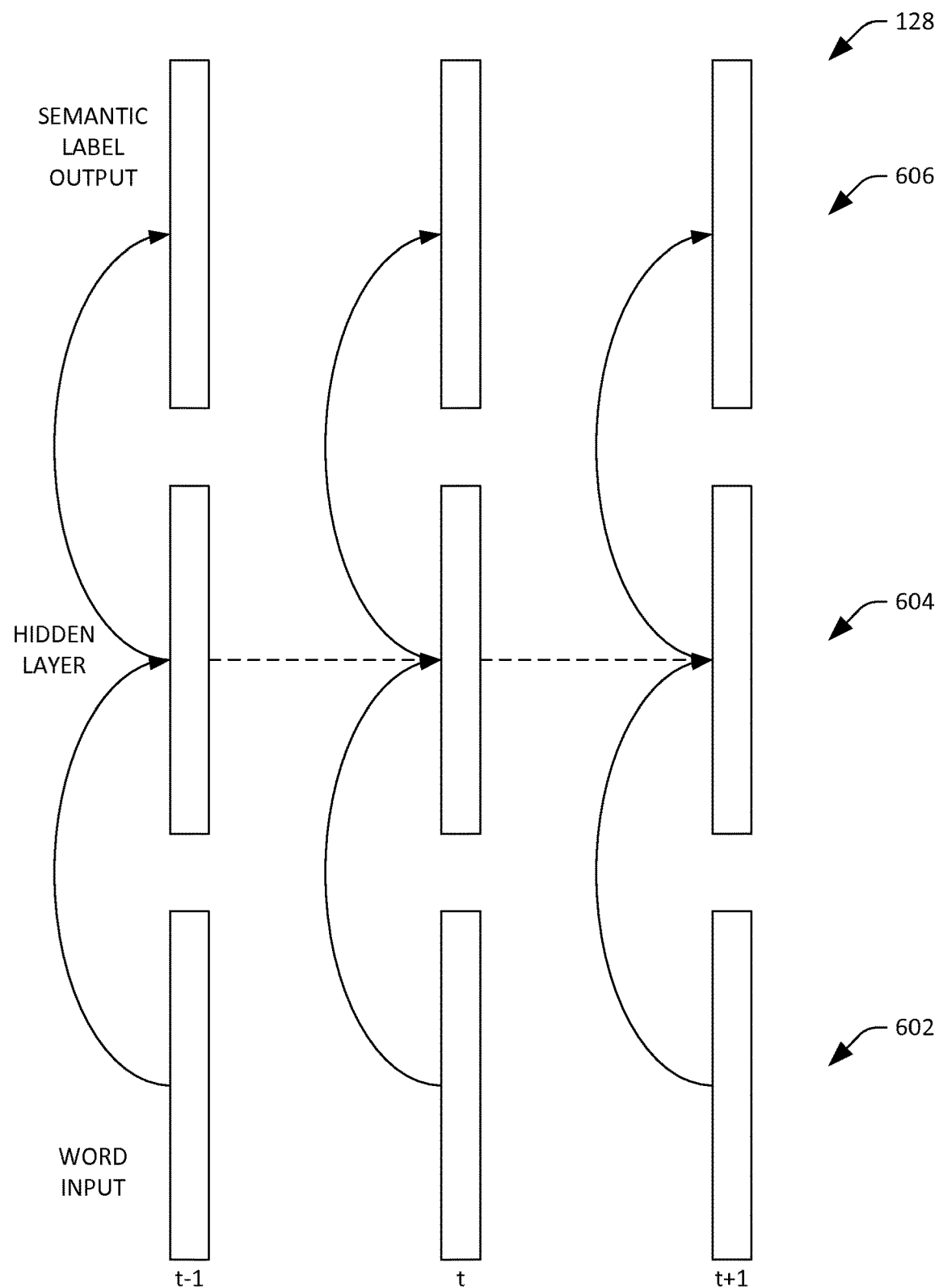
FIG. 6 illustrates an exemplary recurrent neural network (RNN).

As indicated above, the labeler component 124 may, in addition to including the DNN 126 or as an alternative to including the DNN 126, include the RNN 128. An exemplary architecture of the RNN 128 is shown in FIG. 6. In the architecture set forth in FIG. 6, the RNN 128 is shown as being "unrolled" across time to cover three consecutive word inputs. The RNN 128 comprises an input layer 602 at the "bottom" of the RNN 128, a hidden layer 604 in the middle with recurrent connections (shown as dashed lines), and an output layer 606 at the top of the RNN 128. Each layer represents a respective set of nodes, and the layers are connected with weights denoted by the matrices U, W, and V. The input layer (vector) w(t) represents an input word at time t encoded using 1-of-N coding, and the output layer y(t) produces a probability distribution over labels that are assignable to the input word. The hidden layer 604 s(t) maintains a representation of the word sequence history. The input vector w(t) has a dimensionality equal to the vocabulary size, and the output vector y(t) has a dimensionality equal to the number of possible labels. The values in the hidden and output layers are computed as follows:

$$s(t) = f(Uw(t) + Ws(t-1)), \quad (2)$$

$$c(t) = g(Vs(t)). \quad (3)$$

where $$f(z) = \frac{1}{1+e^{-z}}, \quad (4)$$

$$g(z_m) = \frac{e^{z_m}}{\Sigma_k e^{z_k}}.$$

The model can be trained using standard back propagation to maximize the data conditional likelihood, as follows:

$$\Pi_t P(c(t)|w(1), \ldots, w(t), c(t-1)) \quad (5)$$

It can be noted that this model has no direct interdependence between slot output values; the probability distribution is strictly a function of the hidden layer activations, which in turn depend only on the word inputs (and their own past values). Further, a decision on c(t) can be made without reaching an end of the word sequence (sentence), which is in contrast to HMMs and CRFs.

Figure 7:
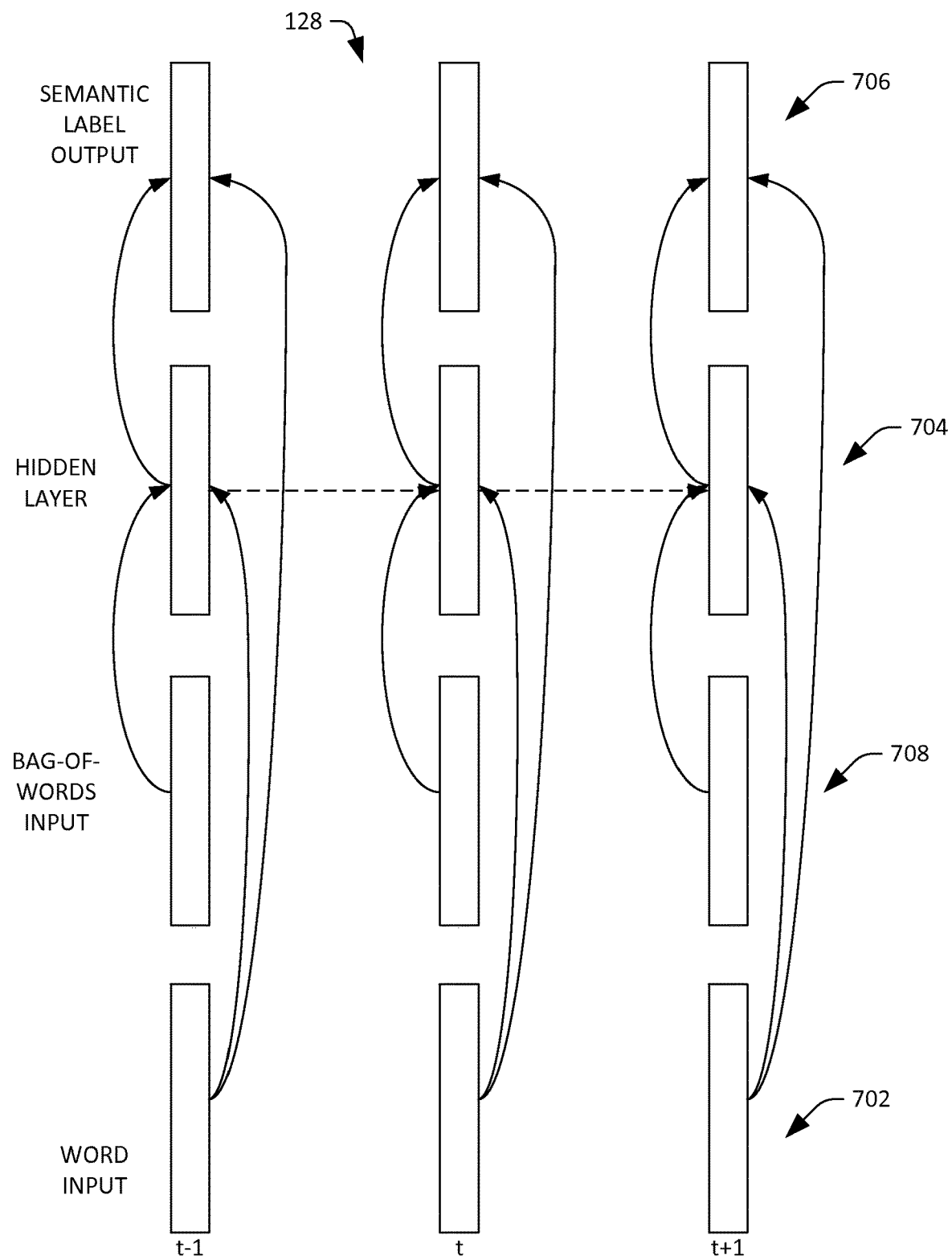
FIG. 7 illustrates another exemplary recurrent neural network (RNN).

Now referring to FIG. 7, another exemplary architecture of the RNN 128 is illustrated. As it is desirable to identify a likeliest label sequence for words in the sequence of words given all words in such sequence, "future" words may be desirably employed as input when determining the semantic label for word w(t). Two exemplary approaches are described herein for doing so. First, the input layer of the RNN 128 can be changed from a "one-hot" representation to an "n-hot" or bag-of-words (BoW) representation, in which there is a non-zero value for not just the current word, but the next n−1 words. An advantage of this approach is using greater context, but a disadvantage is that ordering information is lost.

The second exemplary approach is exemplified in the architecture shown in FIG. 7, which illustrates a "feature-augmented" architecture. In such approach, side information is provided by way of an extra layer 702 of dense (as opposed to "1-hot") inputs f(t) with connection weights F to a hidden layer 704 and G to an output layer 706. A layer 708 of continuous space vector representations of future words can be provided as input to the hidden layer 704. In an exemplary embodiment, the representation of a word can be learned by a non-augmented network (which may comprise weights from the input layer to the hidden layer). To retain word ordering information, representations are concatenated in sequence in a given context window. Training and decoding procedures are otherwise unaltered.

In the architecture of FIG. 7, the activation computation can be modified as follows:

$$s(t)=f(Ux(t)+Ws(t-1)+Ff(t)),\qquad(6)$$

$$c(t)=g(Vs(t)+Gf(t)),\qquad(7)$$

where x(t) can be either w(t) or a bag-of-words vector. For instance, x(t)={w(t), w(t+1)} and comprises current and next words, forming a "2-hot" representation.

Figure 8:
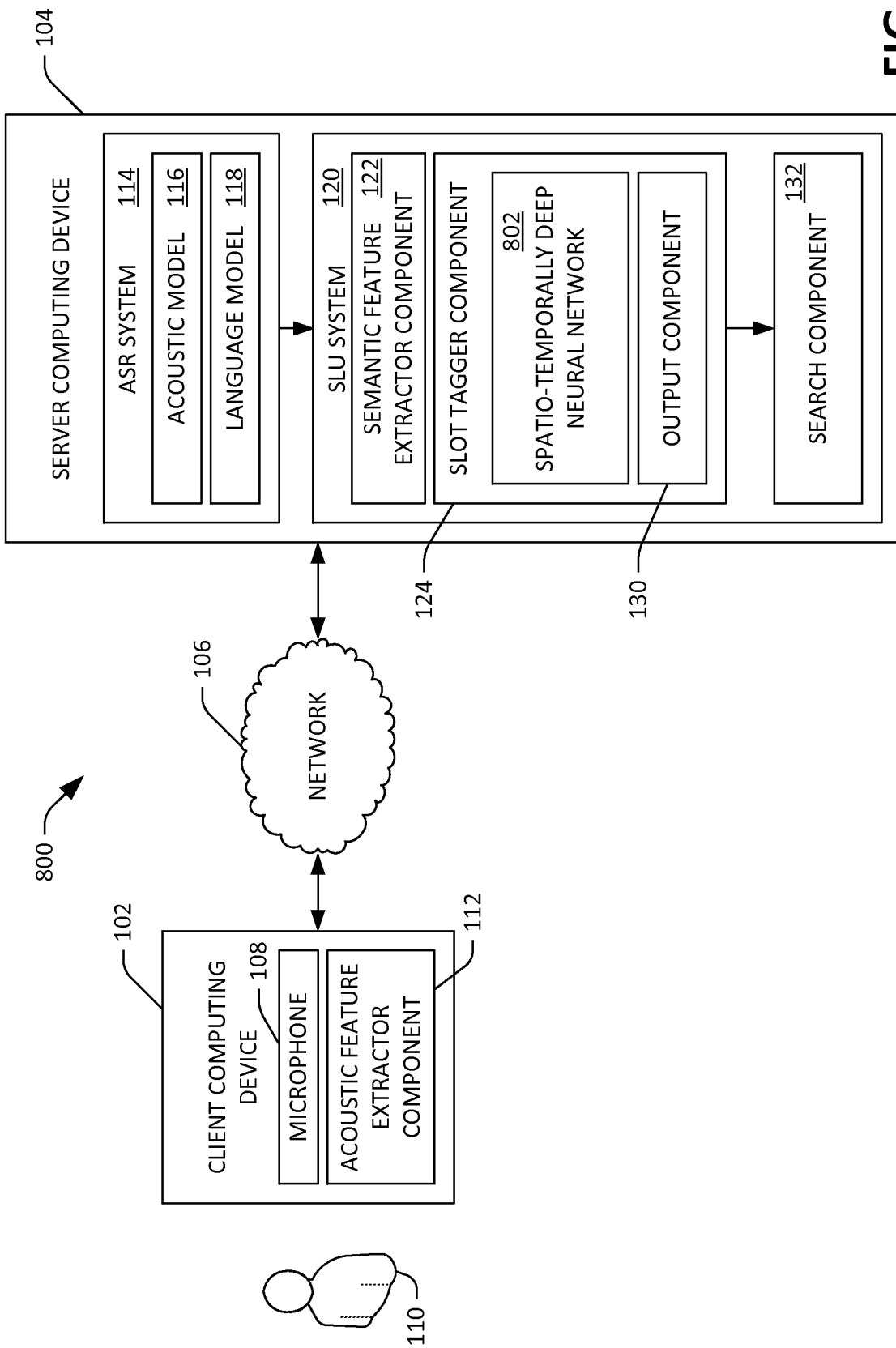
FIG. 8 is a functional block diagram of an exemplary system that facilitates assigning semantic labels to words in a natural language utterance.

Now referring to FIG. 8, another exemplary system 800 that facilitates assigning semantic labels to words in a sequence of words is illustrated. The system 800 includes the client computing device 102 in communication with the server computing device 104 by way of the network 106. In the exemplary system 800, the SLU system 120, rather than including at least one of a DNN or RNN, includes a spatio-temporally deep neural network (ST-DNN) 802. The ST-DNN 802 combines features of both a DNN and a RNN. That is, ST-DNN 802 is both deep in space (e.g., includes several hidden layers used in connection with outputting probabilities over labels) and is further deep in time (e.g., in that long-term context dependencies can be considered when outputting a probability distribution over a sequence of labels that are to be assigned to the respective sequence of words set forth in a natural language utterance by the user 110). The labeler component 124 receives features output by the semantic feature extractor component 122 as input, and outputs a probability distribution over a sequence of labels corresponding to the sequence of tokens. The output component 130 assigns such labels to the sequence of words, and the search component 132 can perform a search based at least in part upon at least one semantic label assigned to at least one word in the sequence of words.

Figure 9:
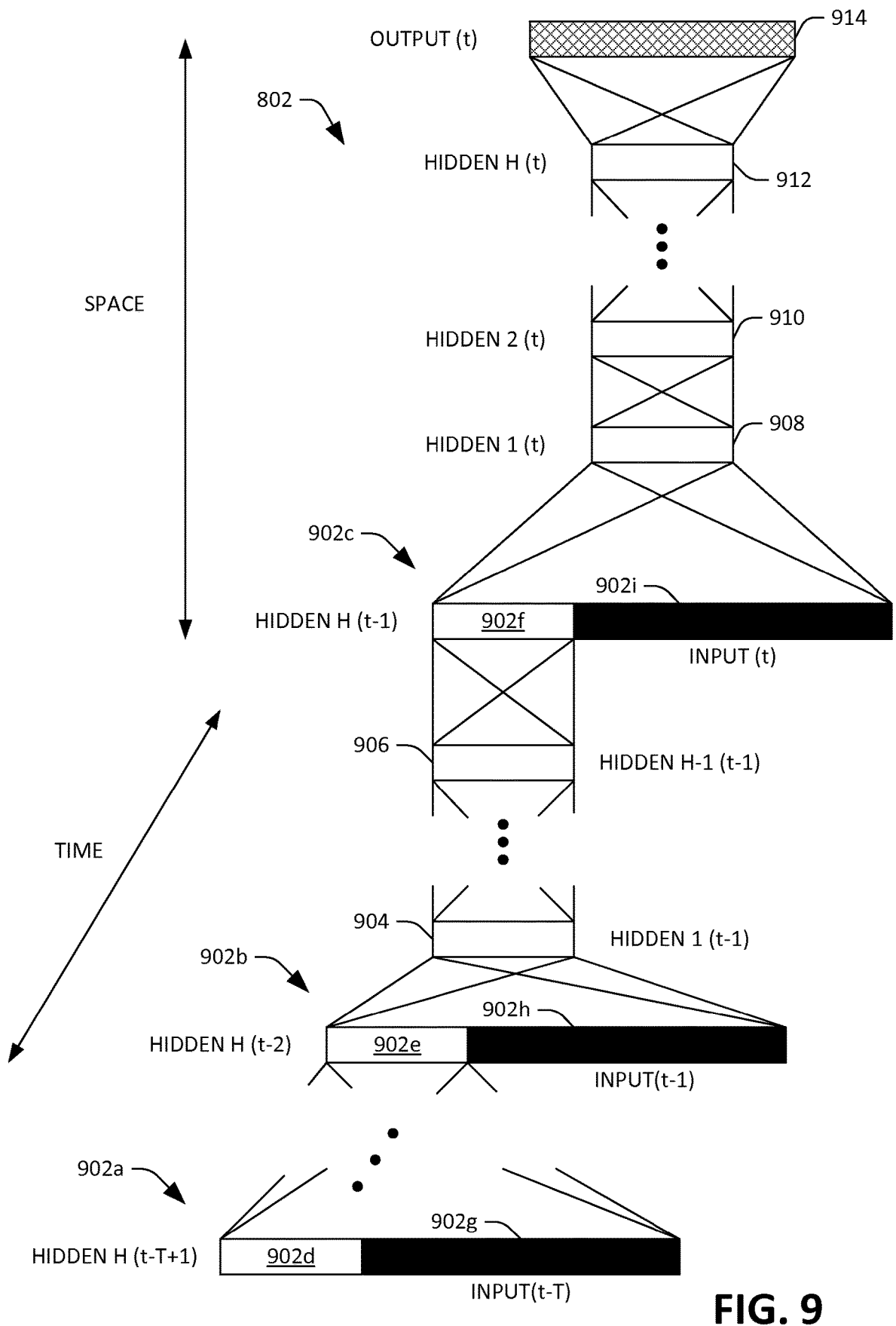
FIG. 9 illustrates an exemplary spatio-temporally DNN (ST-DNN).

Turning to FIG. 9, an exemplary architecture of the ST-DNN 802 is illustrated. Such architecture can be considered a combination of a DNN network and an Elman-style RNN. The architecture set forth in FIG. 9 depicts the ST-DNN 802 in a "rolled-out" fashion, depicting such ST-DNN 802 for different words in the sequence of words. As shown, for each input word corresponds to a respective input layer 902a-902c. The input layers 902a-902c include output from an uppermost hidden layer corresponding to the previous word in the word sequence (902d-902f) as well as the respective input word (shown as 902g-902i) for input words w(t−T), w(t−1), and w(t), respectively. For the word w(t−1), the ST-DNN 802 includes a plurality of hidden layers 904, 906, and 902f. For the word w(t), the ST-DNN 802 includes a plurality of hidden layers 908-912, as well as an output layer 914.

It can therefore be ascertained that in the architecture set forth in FIG. 9, the output from the hidden layer for word w(t−1) is fed back to the hidden layer corresponding to the word w(t) together with the raw input w(t). For each word in the sequence of words, the respective raw input is propagated in a standard feed-forward fashion, and then a parameter updating rule is applied, taking into account the influence of past states through the recurrent connections. Accordingly, context nodes maintain a copy of the previous values of the hidden nodes, since these propagated to the recurrent connections from t−1 before updating rule is applied at t. Therefore, the ST-DNN 802, when using the architecture set forth in FIG. 9, can maintain and learn a state summarizing past inputs, allowing the ST-DNN 802 to perform tasks, such as sequence prediction, that are conventionally beyond the power a standard feed-forward neural networks.

Mathematically, the dynamics of the Elman type of recurrent neural network can be represented as follows.

$$h(t)=f(Ux(t)+Vh(t-1)),\qquad(8)$$

where the sigmoid function at the hidden layer is used:

$$f(x)=\frac{1}{1+e^{-x}},\qquad(9)$$

and a soft max function at the output layer is used:

$$c(t)=g(Wh(t)),\qquad(10)$$

where $$g(z_m)=\frac{e^{z_m}}{\Sigma_k e^{z_k}},$$

where U and V are weight matrices between the raw input and the hidden nodes, and between the connection nodes in the hidden nodes, respectively, while W is the output weight matrix. The input vector x(t) (corresponding to a particular word in a sequence of words) has as dimensionality that of the word embeddings d multiplied by the number of words in the context window. h(t) corresponds to the hidden layer, and c(t) has as dimensionality a number of potential labels.

Figure 10:
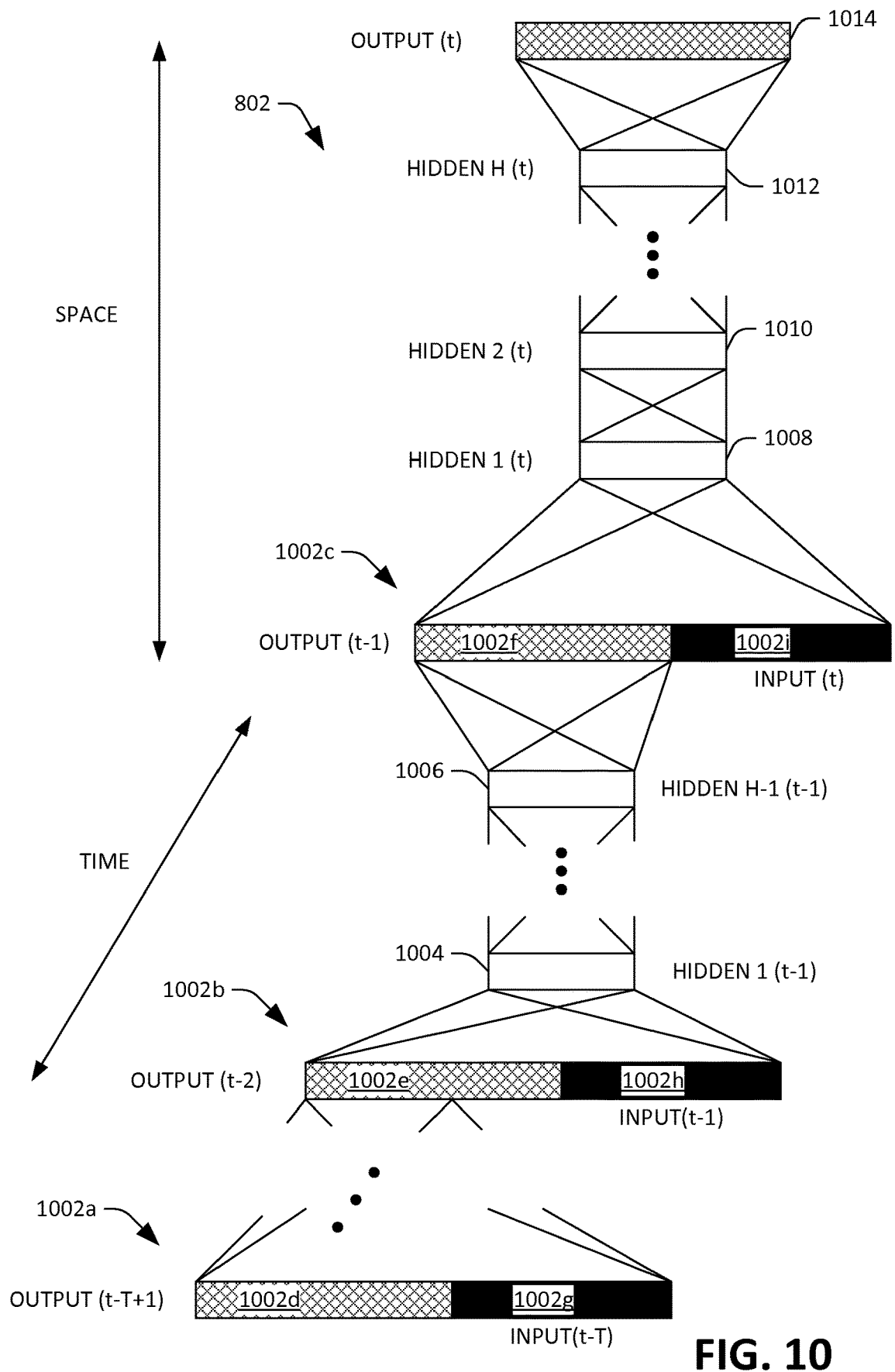
FIG. 10 illustrates another exemplary ST-DNN.

Now referring to FIG. 10, another exemplary architecture of the ST-DNN 802 is illustrated. The exemplary architecture depicted in FIG. 10 is similar to that shown in FIG. 9, except the RNN portion of the ST-DNN 802 is a Jordan-style RNN. In such an architecture, the input to the network for a given word in the sequence of words includes the raw input as well as the output from a soft max output layer. That is, context nodes are fed from the output layer instead of from the hidden layer, in contrast with the Elman-type architecture. A difference between Elman and Jordan-type RNNs appears only in the hidden layer input:

$$h(t)=f(Ux(t)+Vc(t-1)).\qquad(11)$$

Thus, similar to the architecture set forth in FIG. 9, the architecture shown in FIG. 10 comprises a plurality of input layers 1002a-1002c, wherein each input layer comprises context nodes fed from an output layer for a previous word in the sequence of words, as well as the raw input. Thus, the input layers 1002a-1002c comprise respective context layers 1002d-1002f, as well as respective raw input 1002g-1002i. The ST-DNN 802 at t−1 is shown as including a plurality of hidden layers 1004-1006, and at t the ST-DNN 802 includes a plurality of hidden layers 1008-1012. The ST-DNN 802 further comprises an output layer 1014, which outputs a probability distribution over a sequence of labels that are respectively to be assigned to the word w(t).

Additional detail pertaining to RNNs and/or ST-DNNs is now provided. To capture dependencies beyond the input window, as described above, the time connection feedback can be exploited. Learning long-term dependencies with RNNs raises an optimization problem known as the vanishing gradient problem. Indeed, capturing longer time dependencies corresponds to training a deeper model when the RNN is unfolded. Rather than training classical RNNs in this way, some of the past information can be directly provided from different time steps. Thus, instead of relying only on learning through one step recurrences to capture context, recurrence can be combined with the idea of an input window. This can be achieved by feeding the network with concatenation of the t previous time steps vectors (from the output layer, as in the Jordan-type network, or the hidden layer, as in the Elman type network), in addition to the use of word context windows. This also provides a mechanism to obtain a most accurate number of time steps to consider for a particular task. In the case of Elman-type RNNs, the feedback from the output layer leads to the following backward model (predicting from the future to the past) and forward model (predicting from the past to the future).

$$h_{backward}(t) = f(Ux(t) + \Sigma_{k=1}^{T} V_k h(t+k)) \quad (12)$$

and $$h_{forward}(t) = f(Ux(t) + \Sigma_{k=1}^{T} G_k h(t-k)). \quad (13)$$

Further, since having only backward or forward time dependencies uses only partial information, it may be helpful to consider both past and future dependencies together. Bidirectional Elman-type RNNs have been studied and variants of bidirectional Jordan type recurrent neural networks are contemplated as follows:

$$h_{bidir}(t) = f(Ux(t) + \Sigma_{k=1}^{T} V_k c_b(t+k) + \Sigma_{k=1}^{T} G_k c_f(t-k)) \quad (14)$$

where $c_b$ and $c_f$ denote the output of a backward model and a forward model in the Jordan-type RNN, respectively.

Exemplary learning methods pertaining to RNNs and/or ST-DNNs are now set forth. Once the word embeddings have been learned in an unsupervised fashion, it is possible to fine-tune such embeddings during supervised training on a task of interest. Problems may arise, however, in connection with over-fitting.

Sentence level and word level gradient descents are now described. The SLU system 120 can be configured to receive relatively long inputs. With such relatively long inputs, training a RNN and/or ST-DNN may be tricky if updates are undertaken online (e.g., after each word). This is because the predictions about the current word have been made with model parameters that are no longer current, and the sequence of predictions does not correspond to the one that could be performed with a fixed parameter set. For instance, if it is desired to predict or perform an update at a 17$^{th}$ slot of a word sequence with a forward RNN model, all values must be recomputed from the beginning of the word sequence in order to obtain "correct" predictions that are consistent with the current model parameters.

For training an Elman-type RNN, one option to prevent the above problem is to perform mini-batch gradient descent with exactly one word sequence (e.g., sentence) per mini-batch. For a given sentence, one pass can be performed that computes the mean loss for this sentence, and then a gradient update can be performed for the whole sentence. This approach performs well even if the mini-batch size varies for word sequences with different lengths.

A similar learning technique can also be applied for training a Jordan-type RNN (or a ST-DNN that comprises a Jordan-type RNN), which corresponds to performing parameter updates after each word. Like in the mini-batch case, all labels can be computed for the sentence in one pass. This history of values can be kept as an approximation to the exact values, and one gradient step can be performed for each word.

Dropout regularization is now described. Experimentally, it was found that training bidirectional RNNs on slot/concept predictions of previously trained RNNs cause poor generalization results to be output due to over-fitting. To address this issue, dropouts can be implemented, wherein a given portion of the hidden nodes is omitted for each training sample, as well as parts of the input vector. Experimentally, improved performance of the bidirectional recurrent neural network was shown.

Figure 11:
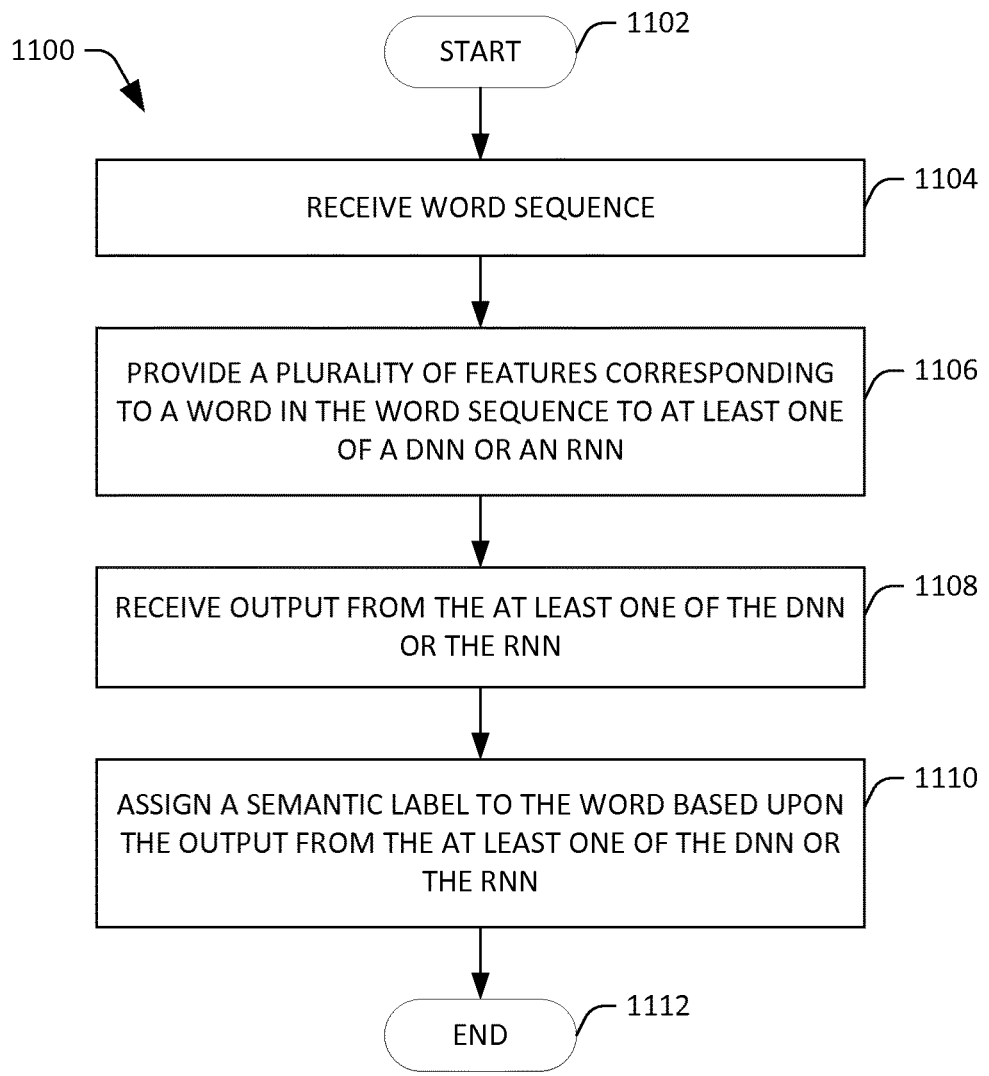
FIG. 11 is a flow diagram illustrating an exemplary methodology for performing slot sequence classification for words in a word sequence.
Figure 12:
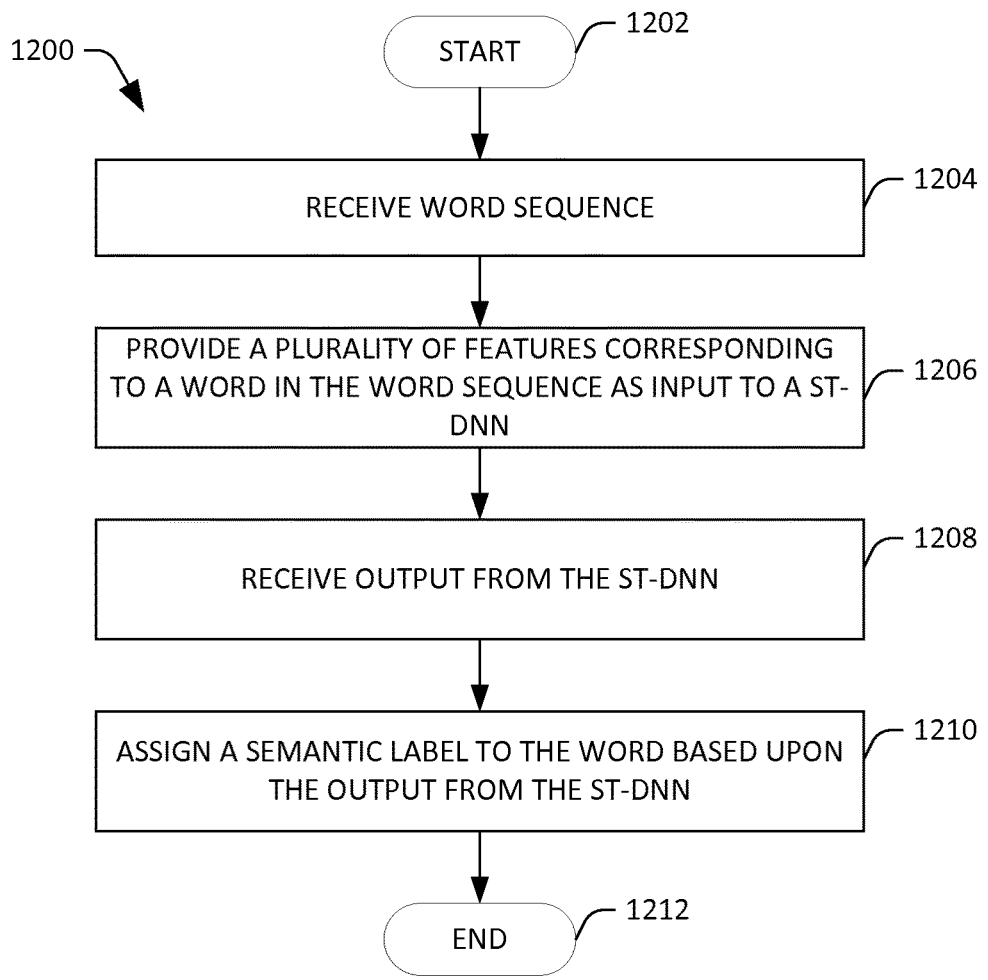
FIG. 12 is a flow diagram illustrating an exemplary methodology for utilizing a ST-DNN to perform slot sequence classification for words in a word sequence.

FIGS. 11-12 illustrate exemplary methodologies relating to assigning labels to words in a word sequence set forth in natural language. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 11, an exemplary methodology 1100 that facilitates assigning a sequence of labels to a sequence of tokens (e.g., words) in a natural language utterance set forth by a user is illustrated. The methodology 1100 starts 1102, and at 1104, a sequence of words is received. As indicated above, such sequence of words may be received from an ASR system.

At 1106, a plurality of features corresponding to a token in the sequence of tokens is provided as input to at least one of a computer-implemented DNN or a computer-implemented RNN. As indicated above, the at least one of the computer-implemented DNN or the computer-implemented RNN is trained to assign semantic labels (e.g., semantic labels) to words in spoken utterances.

At 1108, output of the at least one of the DNN or the RNN is received, wherein the output is indicative of a label that is to be assigned to the word in the word sequence. In an exemplary embodiment, the output can be indicative of a semantic label that is to be assigned to the word. At 1110, the semantic label is assigned to the word based upon the output of the at least one of the DNN or the RNN. The methodology 1100 completes at 1112.

Turning now to FIG. 12, another exemplary methodology 1200 that facilitates assigning a sequence of labels to a respective sequence of words in a natural language utterance set forth by a user is illustrated. The methodology 1200 starts at 1202, and at 1204, a sequence of words is received. At 1206, responsive to receiving the sequence of words, a plurality of features corresponding to a word in the sequence of words is provided as input to a ST-DNN, wherein the ST-DNN has been trained to assign sequences of semantic labels to respective sequences of words.

At 1208, output of the ST-DNN is received, wherein the output is indicative of at least one semantic label that is to be assigned to the word. At 1210, the semantic label is assigned the word based upon the output of the ST-DNN. The methodology 1200 completes at 1212.

Figure 13:
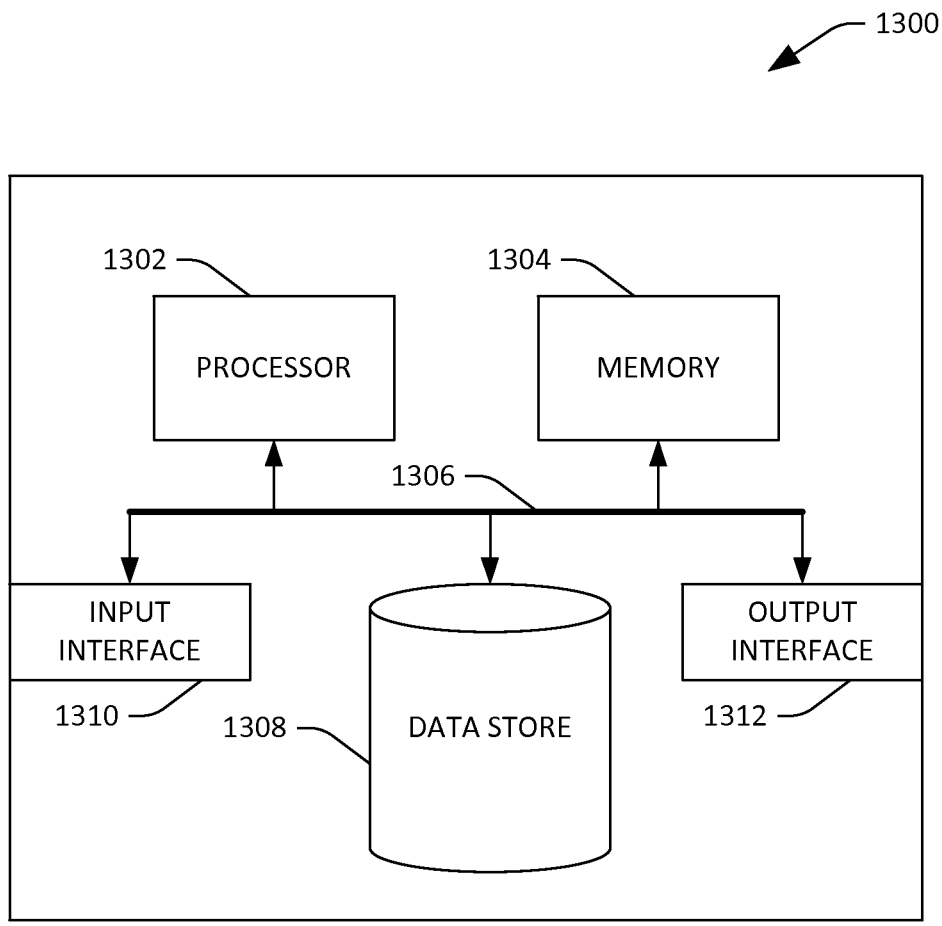
FIG. 13 is an exemplary computing system.

Referring now to FIG. 13, a high-level illustration of an exemplary computing device 1300 that can be used in accordance with the systems and methodologies disclosed herein is illustrated. For instance, the computing device 1300 may be used in a system that supports assigning labels to words in a word sequence. By way of another example, the computing device 1300 can be used in a system that supports learning weights for a DNN, RNN, and/or ST-DNN. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store feature values, labels, training data, etc.

The computing device 1300 additionally includes a data store 1308 that is accessible by the processor 1302 by way of the system bus 1306. The data store 1308 may include executable instructions, feature values, labels, training data, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method comprising a plurality of acts performed by one or more processors of a computing system, the method comprising:
   receiving a sequence of words from a computer-implemented automatic speech recognition (ASR) system that is configured to recognize words in a spoken utterance, the sequence of words comprising the words in the spoken utterance, wherein the ASR system outputs the sequence of words based upon the spoken utterance as captured by a microphone of a client computing device that is in communication with the computing system by way of a network connection;
   responsive to receiving the sequence of words, retrieving respective pluralities of feature values for words in the sequence of words;
   providing a plurality of feature values corresponding to a word in the sequence of words as input to a computer-implemented recurrent neural network (RNN), the computer-implemented RNN trained to assign labels to words, the labels comprising at least one semantic label;
   receiving output of the RNN, the output indicative of a semantic label that is to be assigned to the word, the semantic label identifying a semantic meaning of the word;
   assigning the semantic label to the word based upon the output of the RNN;
   responsive to assigning the semantic label to the word based upon the output of the RNN, searching contents of a computer-readable data repository based upon the semantic label that is assigned to the word to generate search results; and
   transmitting the search results, over the network connection, to the client computing device, wherein the client computing device displays a search result in the search results upon receiving the search results.

2. The method of claim 1, wherein the computing system is one of a video game console or a mobile telephone.

3. The method of claim 1, wherein the computing system is in network communication with at least one of a video game console or a mobile telephone.

4. The method of claim 1, wherein the plurality of feature values comprise:
   the word;
   another word in the sequence of words;
   a named entity corresponding to the word;
   part of speech of the word; and
   a semantic tag assigned to the another word in the sequence of words.

5. The method of claim 1, wherein the plurality of feature values are provided to the RNN, the RNN configured to encode semantic data pertaining to previously received words.

6. The method of claim 5, the RNN being an Elman-style RNN.

7. The method of claim 5, the RNN being a Jordan-style RNN.

8. The method of claim 1, further comprising:
   at the RNN, encoding feature values of words in the sequence of words that precede the at least one word, wherein the output of the RNN is based upon the features values.

9. The method of claim 1, the RNN comprising a recurrent connection.

10. A computing device, comprising:
    a processor; and
    memory that comprises a spoken language understanding (SLU) system executed by the processor, the SLU system comprises a recurrent neural network (RNN), wherein the SLU system, when executed by the processor, causes the processor to perform acts comprising:
       providing a sequence of words to the RNN, the RNN trained to assign labels to words, wherein the SLU system provides the sequence of words to the RNN based upon a spoken utterance as captured by a microphone of a client computing device that is in communication with the computing device by way of a network connection;
       receiving, at the RNN, feature values corresponding to a word in the sequence of words;
       outputting, from the RNN, data that is indicative of a semantic label that is to be assigned to the word, the semantic label output based upon the feature values, the semantic label identifying a semantic meaning of the word; and
       assigning the semantic label to the word based upon the data output by the RNN;
       responsive to assigning the semantic label to the word based upon the data output by the RNN, searching contents of a computer-readable data repository based upon the semantic label that is assigned to the word to generate search results; and
       transmitting the search results, over the network connection, to the client computing device, wherein the client computing device displays a search result in the search results upon receiving the search results.

11. The computing device of claim 10, the RNN configured to encode feature values of words in the sequence of words that precede the at least one word.

12. The computing device of claim 10, the acts further comprising:
    identifying semantic feature values of the word; and
    providing the semantic feature values to the RNN as input, wherein the data output by the RNN is based upon the input.

13. The computing device of claim 10 being one of a video game console or a mobile telephone.

14. The computing device of claim 10 being a server computing device that is in network communication with a video game console or a mobile telephone, the memory further comprising an automatic speech recognition (ASR) system that is executed by the processor, the ASR system, when executed by the processor, causes the processor to perform acts comprising:
    receiving data indicative of a spoken utterance from a user of the video game console or the mobile telephone; and
    outputting the sequence of words.

15. The computing device of claim 10, the acts further comprising a outputting the semantic label to a search system that executes a search over contents of a data repository based upon the semantic label.

16. The computing device of claim 10, wherein the RNN is an Elman-style RNN.

17. The computing device of claim 10, wherein the RNN is a Jordan-style RNN.

18. The computing device of claim 10, the RNN comprising a recurrent connection.

19. A computer-readable storage medium comprising instructions that, when executed by a processor, cause the processor to perform acts comprising:
    receiving, from an automatic speech recognition (ASR) system, a sequence of words, wherein the ASR system outputs the sequence of words based upon a spoken utterance as captured by a microphone of a client computing device that is in communication with the processor by way of a network connection;

responsive to receiving the sequence of words, identifying a plurality of features for a word in the sequence of words;

providing the plurality of features as input to a recurrent neural network (RNN), the RNN trained to assign labels to words;

receiving output from the RNN, the output being a probability distribution over a plurality of labels assignable to the at least one word;

assigning a semantic label from amongst the plurality of labels to the word based upon the probability distribution;

responsive to assigning the semantic label to the word based upon the probability distribution, searching contents of a computer-readable data repository based upon the semantic label that is assigned to the word to generate search results; and transmitting the search results, over the network connection, to the client computing device, wherein the client computing device displays a search result in the search results upon receiving the search results.

20. The computer-readable storage medium of claim 19, the acts further comprising:

at the RNN, encoding feature values of words in the sequence of words that precede the at least one word, wherein the output of the RNN is based upon the features values.

* * * * *